Nov. 14, 1961 L. ŠÍPEK 3,009,083
DEVICE FOR FASTENING THE COMPONENTS OF AN ELECTROMAGNET, ESPECIALLY
FOR FASTENING THE POLESHOES OF AN ELECTROMAGNET DESIGNED
FOR ACCELERATION OF ELECTRICALLY CHARGED PARTICLES
(FOR INSTANCE IN A BETATRON)
Filed Jan. 28, 1959
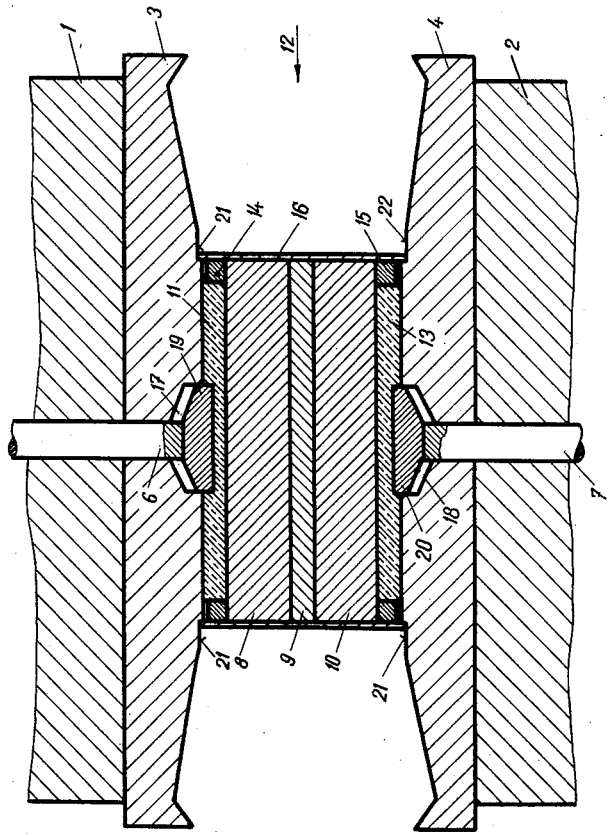
INVENTOR.
Ladislav Šípek
BY 3,009,083
DEVICE FOR FASTENING THE COMPONENTS OF AN ELECTROMAGNET, ESPECIALLY FOR FASTENING THE POLESHOES OF AN ELECTROMAGNET DESIGNED FOR ACCELERATION OF ELECTRICALLY CHARGED PARTICLES (FOR INSTANCE IN A BETATRON)
Ladislav Šípek, Prague, Czechoslovakia, assignor to Tesla, narodni podnik, Prague, Hloubetin, Czechoslovakia
Filed Jan. 28, 1959, Ser. No. 789,718
Claims priority, application Czechoslovakia Jan. 31, 1958
5 Claims. (Cl. 317—200)

The present invention relates to an arrangement for fastening the components of an electromagnet, especially for fastening the pole shoes of an electromagnet designed for the acceleration of electrically charged particles (such as, electrons).

In equipment for accelerating electrically charged particles, an alternating magnetic field is used for the conduction and acceleration of electrons. The field is produced by means of a magnet, consisting of a yoke, poles, pole shoes and cores. The alternating magnetic forces between the parts of the magnet cause heavy vibrations of the pole shoes and the core.

In order to eliminate these vibrations, various threaded bolts are commonly used to press the individual parts of the magnet together. Various hydraulic or pneumatic pressing devices were also developed for the same purpose. The bolts and the hydraulic or pneumatic devices all have a number of serious drawbacks. With volts, the required pressures may be attained only with considerable difficulty. Besides that, this sort of fastening means has other functional disadvantages. On the other hand, the hydraulic or pneumatic fastening devices require a steady supply of the liquid or of the air for producing the required pressure and the other difficulties, inherent in the production and distribution of pressure, must be taken into account: The piping is usually relatively inaccessible and may be dismounted only with considerable, difficulty. It must, therefore, be designed with a high factor of safety. The supply of electricity to pumps and compressors must be very reliable so as to diminish the danger of damage and destruction in case of failures in the pressure supply system.

It is the object of the present invention to eliminate the above mentioned disadvantages by using materials, whose elasticity is sufficiently high, and whose compressibility is practically negligible, as, for instance, rubber or similar materials, for pressing together the components of the magnet. According to the present invention, the structural parts to be mutually fastened (in this case the components of a magnet) have interposed therebetween at least one disc-shaped insertion made of an elastic and practically non-compressible material. Round the periphery of the insertion a rigid ring is fastened. At least one of the disc-shaped insertions is in mechanical contact with a body, that may be axially shifted, and pressed into the insertion. The axially shiftable body may be displaced with the aid of a bolt passing through at least one of the structural parts to be fastened together.

The principle of the present invention may be best described in connection with the accompanying drawing, which shows a sectional view of a magnet suitable for being applied in a betatron. Referring to the drawing in detail, it will be seen that the poles 1 and 2 of the magnet are provided with pole shoes 3 and 4. The core of the magnet consists of two ferromagnetic discs 8 and 10. To the outer surface of the discs the rubber insertions 11 and 13 are fitted, and rigid rings 14 and 15 are located around the peripheries of the insertions 11 and 13. These rings are made of an insulating material. Between the core discs 8 and 10 there is located a spacer 9. The whole core is surrounded by a bush 16 which, at its opposite ends, fits onto raised projections 21 and 22 extending from the confronting faces of the pole shoes 3 and 4, and thus centers the core relative to the pole shoes. The pole shoes 3 and 4 are provided with shallow cavities 17 and 18 opening toward the adjacent rubber insertions 11 and 13 of the core. The pistons 19 and 20, made of insulating material, fit closely in the cavities 17 and 18. When mounting the pole shoes 3, 4 and the core, the pistons 19 and 20 are wholly contained within the cavities 17 and 18. In actual operating position the pistons 19 and 20 are pushed out of the cavities 17, 18, for example, by means of bolts 6, 7 which project into cavities 17 and 18 to there engage the pistons 19 and 20, thus the pistons are pressed into the rubber insertions 11 and 13.

The complete magnet is put together in the following way: First, the core and the pole shoes 3 and 4 are joined, simultaneously inserting an acceleration chamber of the betatron (which, for the sake of simplicity, is not illustrated in the drawing) into the space between the pole shoes 3, 4. The whole unit is then inserted (in the direction of the arrow 12) between the poles 1 and 2. The bolts 6 and 7 must, of course, be withdrawn from the cavities 17 and 18 and wholly retracted into the holes provided in the poles 1 and 2, in the course of the insertion of the assembled core and pole shoes between the poles 1 and 2. The distance between the poles 1 and 2 is, in each case, somewhat greater (by several tenths of a millimetre) than the total or combined height of the complete core and the pole shoes 3 and 4. After the unit consisting of the core and the pole shoes has been brought to the proper position between the poles 1 and 2, the bolts 6 and 7 must be pushed into the corresponding holes in the pole shoes 3 and 4, after which they are exposed to an appropriate force, exerted, for instance, by a screw nut. This causes the pistons 19 and 20 to be driven into the rubber insertions 11 and 13. The rigid rings 14 and 15 prevent the rubber insertions 11 and 13 from escaping outwardly from the space between the core discs 8, 10 and the pole shoes 3, 4. The axial thickness of the insertions 11 and 12 must, therefore, increase in the regions between the pistons 19 and 20 and the rings 14 and 15, respectively, whereby the pole shoes 3, 4 touch the poles 1, 2. By driving the pistons 19 and 20 deeper into the rubber insertions 11 and 13, a pressure is exerted between the pole shoes 3 and 4 and the poles 1 and 2.

The just described arrangement for fastening the components of a magnet by the exertion of a certain pressure satisfies all requirements as to the design and function of the magnet. The device, to which the present invention relates, is not, of course, limited solely to the special design described above, especially as to the structural arrangement, size, material etc. Softened polyvinyl chloride or another non-compressible material or a combination of similar materials may, for instance, be used in place of rubber. The effect of two rubber insertions may, if desired, be replaced by a similar effect exerted by only one rubber insertions. These and other similar alterations do not affect the physical principle, on which the present invention is based.

What I claim as new and desire to secure by Letters Patent of the United States, is:

1. An arrangement for clamping a stacked assembly of rigid elements between two rigid spaced apart parallel surfaces, comprising at least one insert member of elastic and substantially non-compressible material interposed in said stacked assembly, a rigid encircling member extending around the periphery of said insert member between the adjacent rigid elements of the stacked assembly, a rigid body movable perpendicular to said parallel surfaces and engageable with a central portion of said insert member so that said rigid body is adapted to be pressed into said central portion of the insert member for increasing the thickness of the latter in the region between said rigid body and said encircling member, and means operative to press said rigid body into said insert member after said stacked assembly is positioned between said spaced apart parallel surfaces so that the resulting increase in the thickness of said insert member increases the overall height of the stacked assembly and thereby presses the elements of the latter at the opposite ends of the stacked assembly into clamping engagement with said spaced apart parallel surfaces.

2. In an electromagnet, the combination of two poles positioned a fixed distance apart, pole shoes abutting against said poles, a core assembly interposed between said pole shoes and including at least one insert disc of an elastic and substantially incompressible material, a rigid insulating ring extending around said insert disc to laterally contain the latter, a rigid body engageable with a central portion of said insert disc and movable axially so that said rigid body is adapted to be pressed into said central portion of the insert disc for increasing the thickness of the remainder of said disc, and means for pressing said rigid body into said insert disc so that the resulting increase in the thickness of said remainder of the disc correspondingly increases the height of said core assembly and presses said pole shoes against said poles.

3. In an electromagnet, the combination of two poles positioned a fixed distance apart, a pair of pole shoes having a core assembly therebetween and disposed between said poles, said core assembly having an outer sleeve and a stack of elements in the latter, said pole shoes having raised projections extending into the opposite ends of said sleeve for centering the core assembly relative to said pole shoes, said stack of elements including an elastic and substantially incompressible insert disc at least at one end of the stack, the surface of the pole shoe facing said insert disc having a cavity therein, a piston movable axially in said cavity and adapted to be pressed into insert disc for increasing the thickness of the portion of the latter between said piston and the periphery of the insert disc, and means for pressing said piston in the direction out of said cavity into said insert disc so that the resulting increase in the thickness of said portion of the latter urges said pole shoes further apart and into clamping engagement with said poles.

4. In an electromagnet, the combination as in claim 3; wherein said pole shoe facing the insert disc further has a bore extending therethrough and opening into said cavity and the adjacent pole has a bore therein registering with said bore of the pole shoe; and wherein said means for pressing the piston includes a bolt axially movable in the registering bores of the pole and pole shoe and adapted alternatively to project into said cavity and there act against said piston and to be withdrawn into said bore of the pole so as to avoid interference with the insertion of said pole shoes and core assembly as a unit between said poles.

5. In an electromagnet, the combination as in claim 3; wherein said core assembly further includes a rigid ring extending around said insert disc to laterally contain the latter.

References Cited in the file of this patent

UNITED STATES PATENTS 2,695,978     Scag  --------------------  Nov. 30, 1954